United States Patent
Lee et al.

(10) Patent No.: US 10,090,892 B1
(45) Date of Patent: Oct. 2, 2018

(54) APPARATUS AND A METHOD FOR DATA DETECTING USING A LOW BIT ANALOG-TO-DIGITAL CONVERTER

(71) Applicant: Intel Corporation, Santa Clara, CA (US)

(72) Inventors: Namyoon Lee, Pohang Gyeongbuk (KR); Yo-Seb Jeon, Pohang (KR); Oner Orhan, Santa Clara, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/463,133

(22) Filed: Mar. 20, 2017

(51) Int. Cl.
*H04L 25/08* (2006.01)
*H04B 7/0413* (2017.01)
*H04B 7/26* (2006.01)
*H04B 7/08* (2006.01)
*H04B 7/06* (2006.01)

(52) U.S. Cl.
CPC ........... *H04B 7/0413* (2013.01); *H04B 7/063* (2013.01); *H04B 7/0628* (2013.01); *H04B 7/0842* (2013.01); *H04B 7/26* (2013.01)

(58) Field of Classification Search
CPC ..... H04L 27/2647; H04B 1/1027; H04B 1/23; H04B 15/00; H04B 7/0842

USPC ................ 375/346, 150, 348; 370/252, 329; 342/357.25

See application file for complete search history.

(56) References Cited

U.S. PATENT DOCUMENTS

| | | | | |
|---|---|---|---|---|
| 2002/0067761 | A1* | 6/2002 | Kong | H04B 1/7107 375/148 |
| 2013/0217450 | A1* | 8/2013 | Kanj | H01Q 1/242 455/575.7 |
| 2016/0127033 | A1* | 5/2016 | Petrovic | H04B 7/18513 455/12.1 |
| 2016/0269093 | A1* | 9/2016 | Seol | H04B 7/043 |

* cited by examiner

*Primary Examiner* — Khai Tran
(74) *Attorney, Agent, or Firm* — Schiff Hardin LLP

(57) ABSTRACT

An apparatus and a method for detecting data transmitted over a wireless channel are disclosed. For example, for each receive antenna of a plurality of receive antennas, the method converts, by an ADC, an analog signal received by the receive antenna to a respective digital signal, and for each receive antenna of the plurality of receive antennas, the method channel transforms, by a channel transformer, the digital signal to determine a respective equivalent integer representation of the digital signal, and the method detects data by receive combining, by a receive combiner, the respective equivalent integer representations of the digital signals determined for the plurality of receive antennas.

19 Claims, 4 Drawing Sheets

APPARATUS AND A METHOD FOR DATA DETECTING USING A LOW BIT ANALOG-TO-DIGITAL CONVERTER

The present disclosure describes a method and an apparatus for performing data detection using a low bit Analog-to-Digital Converter (ADC). Although, the method is described for detecting data transmitted over a wireless channel of a Long Term Evolution (LTE) network, the data being detected may be data transmitted using any type of wireless network, e.g., a 3G network, a 5G network, and the like.

BACKGROUND

A wireless communication service may be provided via different types of networks, e.g., LTE networks, and the like. Any number of User Equipment (UE) may communicate via each base station, e.g., an eNodeB. As the number of UEs continues to grow, there is an increasing demand for supporting data rates of hundreds of Gbps. In order to support the high data rates, communications systems with large capacity are needed. The capacity of communications systems increases linearly with the bandwidth.

One approach to support very high data rates may be to use ultra-wideband communication systems. For example, wireless networks beyond the LTE, e.g., 5G networks, may need to rely on ultra-wideband systems to deliver data rates of hundreds of Gbps. However, as the bandwidth of the communication system increases, high-speed ADCs are needed. Unfortunately, the energy efficiency of ADCs drops dramatically when the sampling rate is in excess of 100 MHz.

One approach to improve the energy efficiency is by using low-resolution ADCs. The low-resolution ADCs also reduce circuit complexity. As such, for applications that need high-speed sampling, communications systems that use very low-resolution ADCs have received increasing attention. However, once very low resolution ADCs are employed, the capacity of the communications system is fundamentally limited by a quantization level. In other words, delivering the desired data rate, while simultaneously meeting resolution and power requirements is challenging. For instance, as an example, assume a one-bit ADC is used. Then, Quadrature Phase Shift Keying (QPSK) modulation is information-theoretically optimal for a Single-Input Single-Output (SISO) fading channel. Hence, 2 bits/s/Hz is the maximum spectral efficiency for a SISO communications system using the one-bit ADC.

One approach for compensating for the limitation in the spectral efficiency is by using multiple antennas. The spectral efficiency of the communications system improves linearly with the number of receive antennas. Thus, ultra-wideband massive multiple-input multiple-output (MIMO) communication systems operating with low-resolution ADCs have a potential for being communications systems of choice for future networks. Massive MIMO systems may be designed to provide the needed high-capacity while being energy efficient. The high-capacity may be appropriate for supporting future cellular and Wi-Fi communications networks. However, conventional MIMO schemes for detecting data are developed for channels that may be expressed as linear channels. Hence, conventional MIMO schemes for detecting data are suboptimal when a low resolution ADC is used.

BRIEF DESCRIPTION OF THE DRAWINGS

The teaching of the present disclosure can be more fully understood by reading the subsequent detailed description and examples in conjunction with references made to the accompanying drawings, in which.

To facilitate reading, identical reference numbers are used to designate elements that are common to various figures, where possible.

DETAILED DESCRIPTION

The present disclosure relates to an apparatus and a method for detecting data. For example, the teaching of the present disclosure may be for detecting data using a low bit ADC, wherein the data is transmitted for a communication over a wireless network, e.g., a Long Term Evolution (LTE) network, a 5G network, etc.

As described above, the conventional MIMO schemes for detecting data are developed for linear channels. That means the schemes are based on an assumption that the output values of the ADCs are proportional to the input values. Note also that the ADCs quantize the received signals using a stair-type quantizer. The stair-type quantizer may be a uniform or a non-uniform quantizer. A high-resolution quantizer may preserve the linear relationship between the input and output values of the ADCs. However, the use of low-resolution ADCs changes the MIMO channels from channels that can be expressed as linear to channels that can no longer be expressed as linear. In other words, when using a low-resolution stair-type quantizer, the resulting MIMO channel is no longer a linear channel. Thus, the conventional MIMO schemes for detecting data that are developed for linear channels are highly suboptimal.

The present disclosure relates to an apparatus and a method for detecting data by interpreting the MIMO channel with a low-resolution ADC as a linear MIMO channel over a finite field. The resolution is referred to as a "low level resolution" when the ADC is using n bits with n being a small integer. For example, with n=1, . . . , 5.

Figure 1:
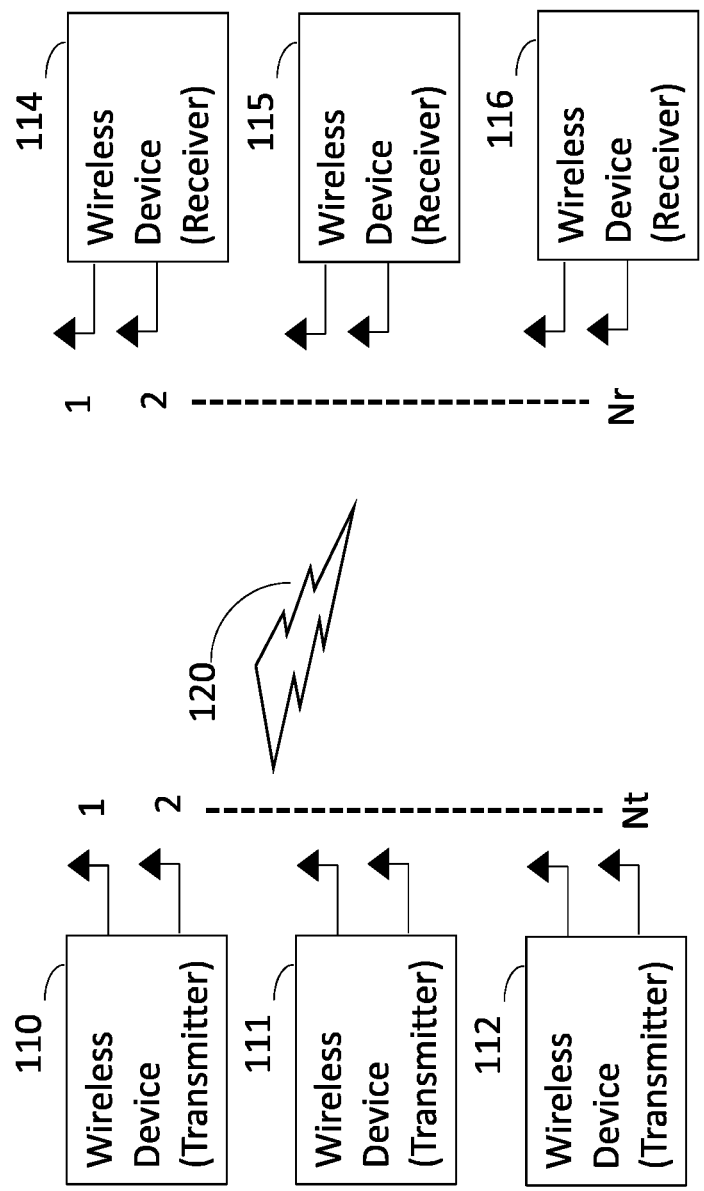
FIG. 1 illustrates a wireless network for providing services to wireless devices.

FIG. 1 illustrates a wireless network 100 for providing services to wireless devices. The wireless network comprises transmitter wireless devices 110-112 and receiver wireless devices 114-116 communicating over a wireless channel 120. For example, the transmitter wireless device may be a user equipment and the receiver wireless device may be base station. In another example, the transmitter wireless device may be a base station and the receiver wireless device may be a user equipment.

Each of the transmitter wireless devices may comprise any number of transmit antennas. Similarly, each of the receiver wireless devices may comprise any number of receive antennas.

For an illustrative example, suppose the wireless channel 120 is a channel of a MIMO communications system, and channel 120 is for supporting communication among $N_t$ transmit antennas and $N_r$ receive antennas, then the communications system may be referred to as an $N_t \times N_r$ MIMO system. For example, a 4×4 MIMO system may support 4 transmit antennas and 4 receive antennas. When $N_t$ is equal to one and $N_r$ is more than one, the communications system may be referred to as a Single-Input Multiple-Output (SIMO) system. Similarly, when $N_r$ is equal to one and $N_t$ is more than one, the communication system may be referred to as a Multiple-Input Single-Output (MISO) system. Note that each antenna may be associated with a unique wireless device or multiple antennas may be associated with the same wireless device. For instance, the 4 transmit antennas of the 4×4 MIMO system may be on a same transmitter wireless device. For the purpose of the present disclosure, each receiver wireless device may then comprise up to $N_r$ receive antennas.

Those ordinarily skilled in the present art realize that the antennas of the present disclosure may be antennas of a transceiver that may be used for both transmitting and receiving of a wireless signal. For clarity, as to a direction of transmission, the present disclosure is described using "receive antenna" and "transmit antenna." Without loss of generality or adding limits as to implementation, the receiver and transmitter portions of a transceiver antenna may be describer, separately.

Figure 2:
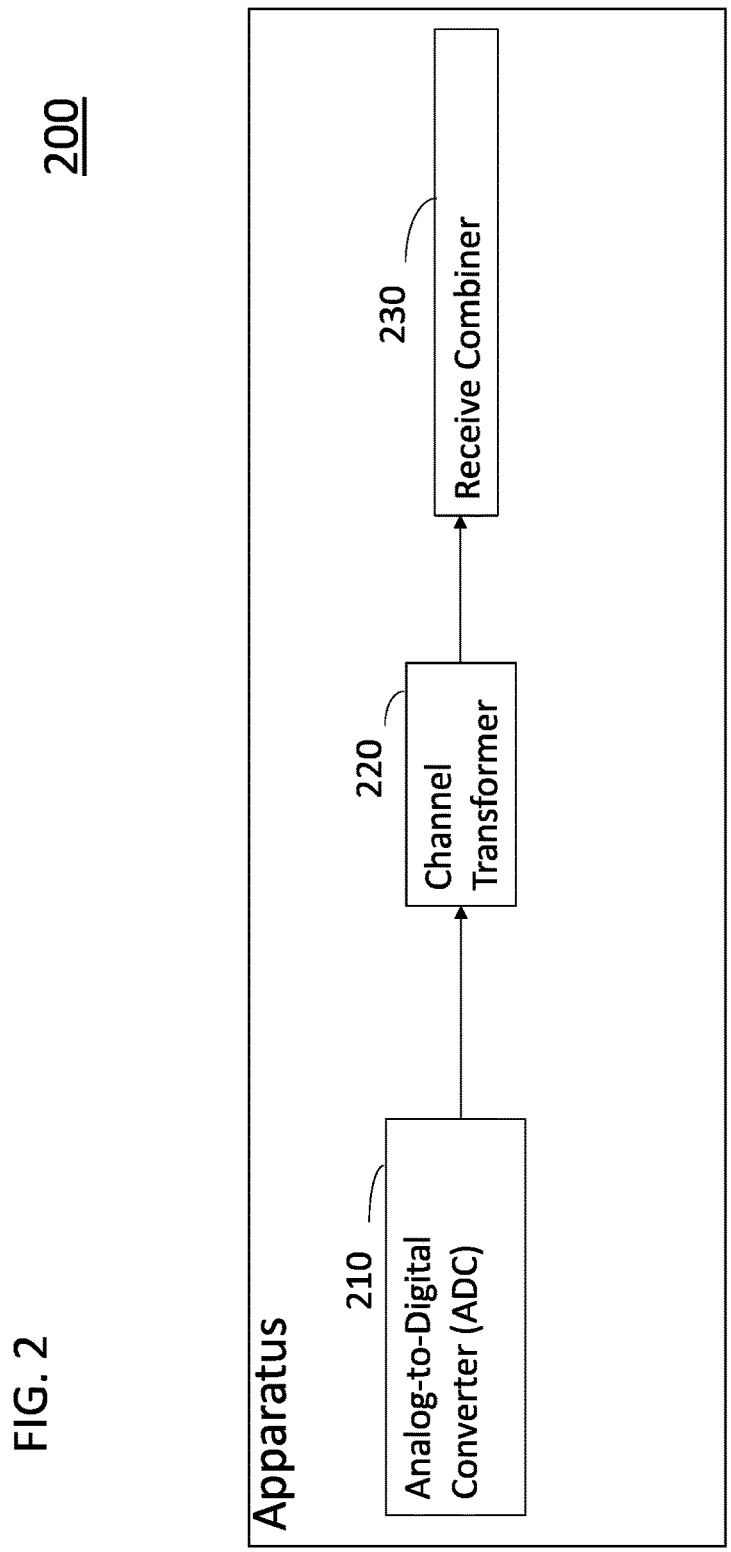
FIG. 2 illustrates an apparatus for performing data detection for received signals in accordance with the teachings of the present disclosure.

FIG. 2 illustrates an apparatus 200 for performing data detection for received signals in accordance with the teachings of the present disclosure. The apparatus 200 is comprised within each receiver wireless device 114-116 described above with respect to FIG. 1. The apparatus 200 comprises an ADC 210, a channel transformer 220, and a detector 230. It is noted that the detector 230 performs the data detection by combining the signals received via a plurality of receive antennas. As such, the detector 230 may also be referred to as a receive combiner.

The ADC 210 is configured, for each receive antenna of a plurality of receive antennas of a receiver device, to convert an analog signal received by the receive antenna to a respective digital signal. For instance, suppose digital equivalents of signals received by a particular receive antennas are to be stored in a matrix. Then, an estimated channel matrix may be defined, where each element of the estimated channel matrix comprises the digital equivalent of an analog signal received by a particular receive antenna.

In one aspect, the ADC comprises a one-bit ADC. In one aspect, the ADC comprises a p-level scalar quantizer. In one aspect, a step size of the p-level quantizer is chosen according to a transmit power constraint signal-to-noise ratio (SNR). In one aspect, the p-level scalar quantizer comprises a sawtooth transform. In one aspect, when the p-level scalar quantizer is a sawtooth transform, the sawtooth transform may be implemented by a scalar quantizer followed by a modulo operator. In one aspect, the signal received by the receive antenna comprises signals transmitted by any number of transmit antennas.

The channel transformer 220 is configured, for each receive antenna of a plurality of receive antennas, to channel transform the digital signal to determine a respective equivalent integer representation of the digital signal. For example, for a one bit ADC, the channel transformation may transform the output of the ADC 210 into an equivalent binary representation. The channel transforming is based on the known effective channel matrix.

The receive combiner 230 is configured to detect data by receive combining the respective equivalent integer representations of the digital signals determined for the plurality of receive antennas. Once the receive combining is completed, the detected data may be provided to a demodulator of the receiver device.

In one aspect, the receive combining comprises selecting a receive antenna from among the plurality of receive antennas. In one aspect, the selected receive antenna provides a sub-channel with a highest channel capacity. For example, suppose there are three receive antennas. Then, there are three sub-channels, with each sub-channel being associated with a particular receive antenna. Then, the receive combining may be to select, from among the three receive antenna, the receive antenna with the highest capacity.

In one aspect, the selected receive antenna is identified by determining the sub-channel with a minimum entropy of an effective noise. Determining the sub-channel with the minimum entropy of the effective noise is further described below in Example A.

In one aspect, the receive combining comprises applying a majority decoding principle when repetition coding over a spatial domain is used. In one aspect, the repetition coding over the spatial domain is for transmitting same data to the plurality of receive antennas through different respective plurality of sub-channels.

In one aspect, the receive combining comprises detecting the data by identifying a linear block code with a minimum distance from the equivalent integer representations of the digital signals. In one aspect, the identifying of the linear block code with the minimum distance is based on a known effective binary channel matrix and a known set of all possible linear block codes that are transmitted to the plurality of receive antennas. An approach for implementing the determining of the linear block code with the minimum distance is further described below in Example A.

In one aspect, the receive combining comprises detecting the data by performing inter-stream interference cancelation. In one aspect, the inter-stream interference cancelation is performed using an inverse of an effective binary channel matrix. The effective binary channel matrix is known by the receiver. In one aspect, the inter-stream interference cancelation is performed when the data is encoded using a family of nested linear codes.

In one aspect, the detecting of the data by using the inverse of the effective binary channel matrix is performed when a number of transmit antennas of a transmitter device are equal to a number of receive antennas of a receiver device. In one aspect, when the number of receive antennas of the receiver device is greater than the number of transmit antennas of the transmitter device, the detecting of the data by using the inverse of the effective binary channel matrix is performed by first selecting a given number of receive antennas, wherein the given number is equal to the number of transmit antennas of the transmitter device and then using the inverse of the effective binary channel matrix for the selected receive antennas. That is, the inversion is performed when the channel is symmetrical. The inverse of the effective binary channel matrix may then be computed as long as the determinant of the effective binary channel matrix is not zero. That means, the channels for the selected receive antennas are linearly independent. The detecting of the data by performing the inter-stream interference cancelation is further described in Example A.

In one aspect, the receive combining comprises detecting the data by performing a plurality of: selecting a receive antenna from among the plurality of receive antennas, applying a majority decoding principle when repetition coding over a spatial domain is used, detecting the data by identifying a linear block code with a minimum distance from the equivalent integer representations of the digital signals, and detecting the data by performing inter-stream interference cancellation. For example, the receive combining may be performed by first selecting a sub-set of receive antennas from among the plurality of receive antennas, followed by detecting the data by performing inter-stream interference cancelation. For instance, if there are more receive antennas than transmit antennas, the selection of the sub-set may be to have the same number of transmit and receive antennas. Then, the detecting may be performed by using the inverse of the effective binary channel matrix. It is noted that the effective binary channel matrix used for the sub-set of receive antennas is smaller and hence the computation is simplified.

Figure 3:
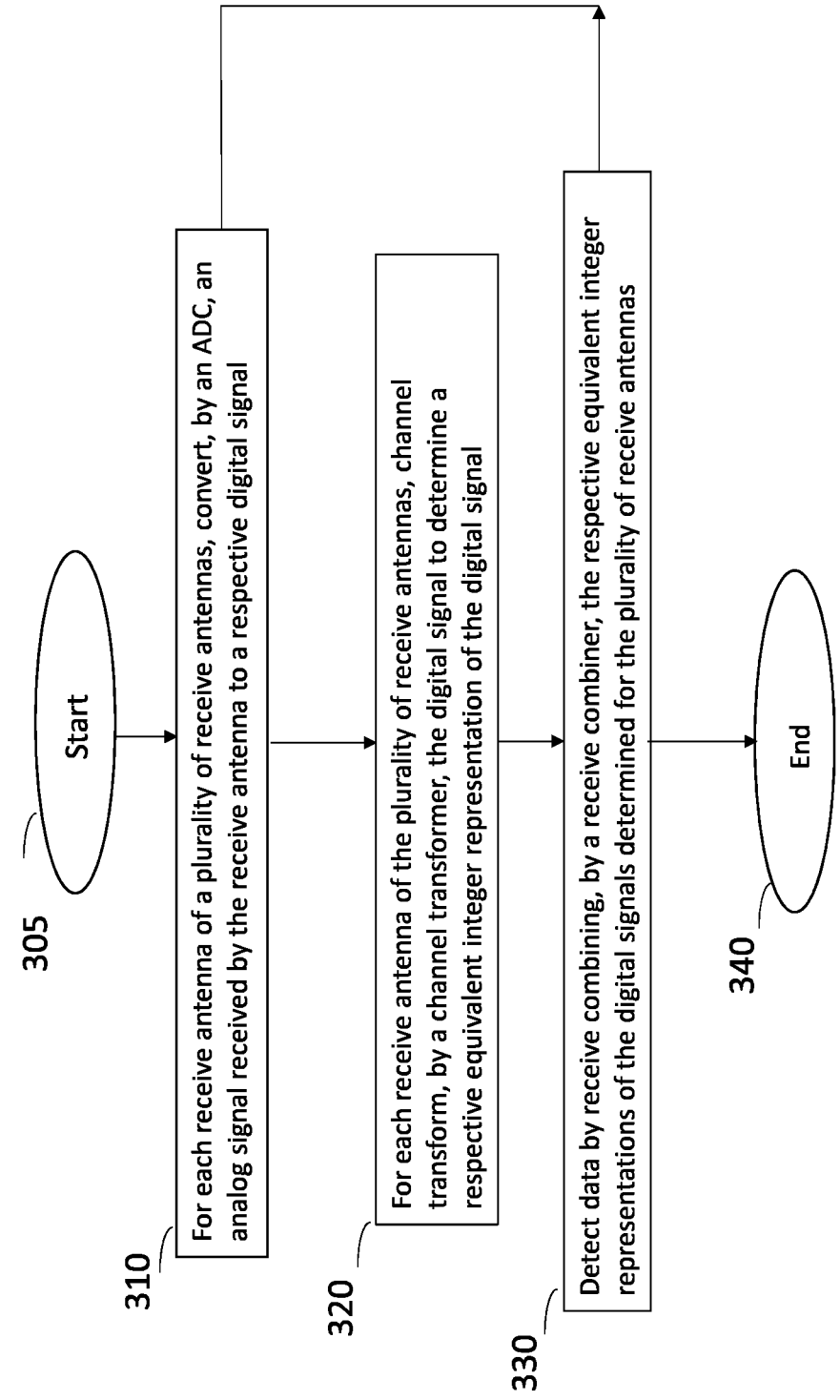
FIG. 3 illustrates a flowchart of an example method for detecting data in accordance with the present disclosure.

FIG. 3 illustrates a flowchart of an example method 300 for detecting data in accordance with the present disclosure. An example of an implementation of Method 300 is provided in "Example A" below.

In one aspect of the present disclosure, the method 300 may be implemented in a wireless device that comprises an array of receive antennas configured to receive a plurality of signals and an apparatus, e.g., apparatus 200, for detecting data from a plurality of received signals. For example, the method 300 may be implemented in an apparatus 200 wherein the converting is performed by ADC 210, the channel transforming is performed by channel transformer 220, and the receive combining to detect data is performed by receive combiner 230. In another example, the method 300 may be implemented in a device 400, described below.

The method 300 starts in a step 305 and proceeds to step 310.

In step 310, for each receive antenna of a plurality of receive antennas, the method converts, by an ADC 210 an analog signal received by the receive antenna to a respective digital signal.

In step 320, for each receive antenna of the plurality of receive antennas, the method channel transforms, by a channel transformer 220, the digital signal to determine a respective equivalent integer representation of the digital signal.

In step 330, the method detects data by receive combining, by a receive combiner 230, the respective equivalent integer representations of the digital signals determined for the plurality of receive antennas. Steps 310-330 are performed for each time slot in which data is received by the plurality of receive antennas. The method may then proceed to step 340 to end the detecting of data or to step 305 to receive more signals from which more data is to be detected in accordance with the present disclosure.

Figure 4:
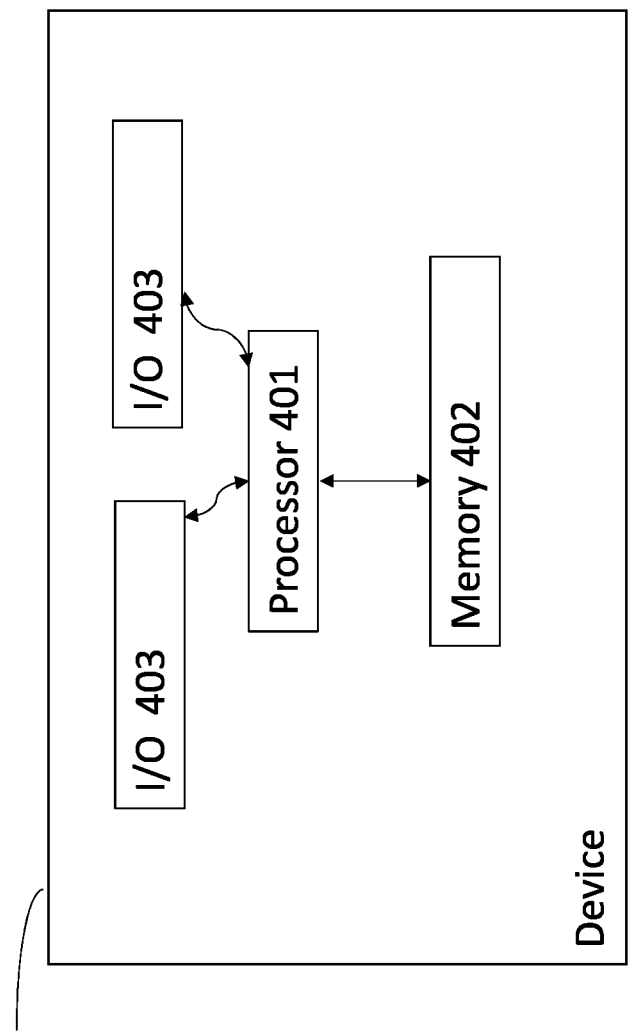
FIG. 4 illustrates a device for performing the functions described in the present disclosure.

FIG. 4 illustrates a device 400 for performing the function described in the present disclosure. The device 400 comprises a processor 401 and a memory 402 configured to store program instructions to be executed by the processor 401, where executing the program instructions causes the processor 401 to perform operations for detecting data from a plurality of signals received over a wireless channel, the operations comprise, converting, channel transforming, and receive combining. The device 400 may further comprise any number and type of input/output devices 403.

It is noted that although FIG. 4 illustrates a single device, the method 200 may be implemented via any number of devices performing the operations of method 300 in a distributed manner, serial manner, or a combination thereof. In addition, the devices may be virtualized devices instantiated on servers (e.g., servers of a cloud network). As such, the representation of the hardware components of the device may be a virtualized or a physical representation, without departing from the teaching of the present disclosure. Accordingly, the method 300 may be implemented in hardware, software, or a combination thereof. It is noted that the processor 401 executing the program instructions includes the processor 401 performing the operations of the method 300 directly or indirectly. For example, the processor 401 may perform the operations in conjunction with other devices or may direct another device to perform the operations.

It should be understood that the aspects of the present disclosure are described above by way of examples. However, the various aspects are exemplary and not limitations. Thus, the scope of the present disclosure should not be construed as being limited by any of the above aspects or examples. The breadth and the scope of the present disclosure should be defined in accordance with the scope and breadth of the following claims and/or equivalents.

Example A: A Communications System Implementing the Data Detection Method of the Present Disclosure Suppose a communication system of FIG. 1 between a transmitter device and a receiver device is considered. In addition, suppose the transmitter device is equipped with $N_t$ transmit antennas, the receiver device is equipped with $N_r$ receive antennas, and $N_r \geq N_t$.

At a given time slot n, suppose the transmitter device transmits an $N_t$ multiple code word vector $x[n] \in \{0,1\}^{N_t}$ to the receiver device.

Each receive antenna receives some combination of signals transmitted by the transmit antennas. Suppose a channel matrix is denoted by $H \in \mathbb{R}^{N_r \times N_t}$. It is noted that H is known to the receiver. In addition, suppose the received signal includes an additive Gaussian noise with zero mean and unit variance. The additive Gaussian noise may be denoted by $z \in \mathbb{R}^{N_r}$. Then, a received signal vector before quantization (i.e., before applying the ADC) may be defined as an $N_r$ multiple vector $y[n] \in \mathbb{R}^{N_r}$, wherein $y[n] = H\ x[n] + z$. The received signal (i.e., vector $y[n]$) is the input to the ADC.

Step 310

Suppose the ADC is a one-bit ADC (i.e., an ADC with two levels). Then, the function of the operation performed by the ADC is for converting each received signal to one of the quantization levels. In other words, if $Q_2$ represents the function of the ADC, then $Q_2: \mathbb{R} \to \{0,1\}$. For a receive antenna m, at time slot n, the output of the ADC may be represented as:

$$y_m[n] = Q_2\left(\sum_{l=1}^{N_t} h_{m,l} x_l[n] + z_m[n]\right), \quad \text{(Equation 1)}$$

where $h_{m,l}$ is the (m,l)-th element of H, $x_l[n]$ is the l-th element of $x[n]$, and $z_m[n]$ is the noise for receive antenna m. Note that $y_m[n] \in \{0,1\}$ after step 310 is performed. In other words, each element of $y[n]$ has a value of "0" or "1" based on the result of the quantization by the ADC.

Step 320

In step 320, for each receive antenna m, the channel transformer transforms the output of the ADC into an equivalent binary representation. In one aspect, the transforming is based on the effective channel matrix. Suppose the effective channel matrix between the transmitter and receiver is represented by $A \in \{0,1\}^{N_r \times N_t}$. Then, for antenna m, at time slot n, the output of the channel transformer 220 may be represented by:

$$y_m[n] = \sum_{l=1}^{N_t} a_{m,l} x_l[n] \oplus \tilde{z}_m[n], \quad \text{(Equation 2)}$$

-continued $$\text{where } \tilde{z}_m[n] = z_m[n] + \sum_{l=1}^{N_t} (h_{m,l} - a_{m,l})x_l[n]$$

⊕ denotes addition over a finite-field, and
$\alpha_{m,l}$ is the (m, l)-th element of A, and $\tilde{z}[n]$ is the effective noise.

Step 330

In step 330, the receive combiner detects data by receive combining the respective equivalent integer representations of the digital signals determined for the plurality of receive antennas. The receive combining may be implemented using one or more of A-D, as described below.

A. Receive Combining by Determining the Sub-Channel with the Minimum Entropy of the Effective Noise As described above, determining the sub-channel with the highest capacity is the same as determining the sub-channel with the minimum entropy of the effective noise. Suppose, a parallel binary symmetric channel model is applied to the binary representation in the equation above. Then, selecting the sub-channel with the highest capacity may proceed as follows. First, an antenna index i* may be defined to denote the receive antennas with the minimum entropy of the effective noise. Then, the appropriate value for i* may be determined as:

$$i^* = \arg\min_{i \in \{1,2,...,N_r\}} H(p_i) \quad \text{(Equation (3))}$$

where $p_i$ is a parameter of a Bernoulli random variable for modeling $\tilde{z}_m[n]$.

Then, the function for performing the receive combining may be defined as a linear matrix with all elements being zero except when both the column and row are i*. When both the column and row are i*, the element of the matrix is equal to one. In other words, f(y[n])=Wy[n], where W(i,j)=0 for i,j∈{1, 2, ..., $N_r$}/{i*} and W(i*,i*)=1. Then, f(y[n]) is an estimate for the detected data. The receive antenna with the highest capacity is selected and the estimate for the detected data is then based on the receive antenna with the highest capacity.

B. Receive Combining by Applying the Majority Decoding Principle

As described above, the receive combining by applying the majority decoding principle is performed when the same data is transmitted by the transmitter device to the receiver device via multiple sub-channels.

For example, suppose the transmitter device comprises one transmit antenna and the receiver device comprises three receive antennas. Suppose also, for time slot 1, the transmitted data is "1". In other words, $x_1[1]=1$ is transmitted via the one transmit antenna. The received output vector is given by $y[1]=[y_1[1], y_2[1], y_3[1]]^T$, where $y_m[1]=x[1]+\tilde{z}_m[1]$ for m∈{1,2,3}. Suppose, the equivalent integer representations of the digital signals, as determined in step 320, are $y_1[1]=1$, $y_2[1]=1$, $y_3[1]=0$, for receive antennas 1, 2 and 3, respectively. Then, $y[1]=[1,1,0]^T$. Since the same information was sent through the three different sub-channels (i.e., $x_1[1]=1$) the scenario implies that the first two sub-channels are of good quality while noise in the last sub-channel flips the output. An estimate $\hat{x}[1]$ for the detected data may then be determined by applying the majority decoding principle. For the example above, the receive combining by the majority decoding principle outputs one as the estimate for $\hat{x}[1]$. In other words, $\hat{x}[1]=f(y[1])=1$.

The receive combining by applying the majority decoding principle to find an estimate for $\hat{x}[n]$ at time slot n, when the number of receive antennas is $N_r$, may be written as:

$$\hat{y}[n] = f(y[n]) = \left\lfloor \frac{1}{2} + \frac{\bigoplus_{k=1}^{N_r} y_i[n]}{N_r} \right\rfloor, \quad \text{(Equation 4)}$$

where $\bigoplus_{i=1}^{N}$ is summation operation.

C. Receive Combining by Identifying a Linear Block Code with a Minimum Distance from the Equivalent Integer Representations of the Digital Signals.

As described above, the receiver knows the effective binary channel matrix. In addition, the receiver knows all possible code words that may be transmitted by the transmitter device. For example, for the $N_t$ transmit antennas, there are $2^{N_t}$ possible input vectors. Each of the possible input vectors are candidates for being the transmitted code.

The receiver then creates a code word vector for each of the $2^{N_t}$ possible input vectors. In other words, the receiver creates $2^{N_t}$ code word vectors, with each code word vector being created for a respective one of the $2^{N_t}$ possible input vectors. For example, the $1^{st}$ code word vector is determined by multiplying the binary channel matrix by the $1^{st}$ possible input vector, etc. Hence, the $2^{N_t}$ code word vectors are determined by multiplying the binary channel matrix by the respective one of the $2^{N_t}$ possible input vectors.

Then, the receive combining may then be performed for selecting the code word vector with the minimum distance from the equivalent integer representations of the digital signals. The code that is selected is from among the $2^{N_t}$ code word vectors that are created. Thus, the function for performing the receive combining may be defined as:

$$\hat{x}[n] = f(y[n]) = \arg\min_{k=\{1,2,...,2^{N_t}\}} d(c_k, y[n]), \quad \text{(Equation 5)}$$

where d(a, b) is a distance measure for two vectors a and b. Those ordinarily skilled in the current art realize that any known (i.e., standard) distance measure between two vectors may be used.

D. Receive Combining by Performing Inter-Stream Interference Cancelation

As described above, the inter-stream interference cancelation is performed by determining the inverse of the effective binary channel matrix and computing the product of the inverse of the effective binary channel matrix and the equivalent integer representations of the digital signals. The function for performing the receive combining using the inter-stream interference cancelation may then be defined as:

$$\hat{x}[n]=f(y[n])=A^{-1}y[n]=x[n]\oplus A^{-1}\tilde{z}[n], \quad \text{(Equation 6)}$$

where $x[n]=[x_1[n], ..., x_{N_t}[n]]^T$, and $\tilde{z}[n]=[\tilde{z}_1[n], ..., \tilde{z}_{N_r}[n]]^T$. The estimates for x[n] may then be elements of the vector having $N_r$ elements. In other words, the function yields $N_r$ parallel channels given by:

$$\hat{x}_m[n] = x_m[n] + b_m[n], \quad \text{(Equation 7)}$$

-continued $$\text{where } b_m[n] = \bigoplus_{k=1}^{N_r} a_{m,k}^{-1} \tilde{z}_k[m].$$

It is noted that when the number of receive antennas is much larger than that of the transmit antennas, the receive combiner of the present disclosure significantly reduces the dimension of observation by using a linear combiner or a simple non-linear function, while obtaining the receive diversity. Since the demodulation is performed after the receive combining, the complexity of the demodulation can be reduced. For example, the receive combining (or detection of data) for the linear MIMO channel over a finite field can adopt matrix inversion in the finite field or a successive-coding method. The matrix inversion in the finite field and the successive-coding method have less implementation complexity than those for the non-linear MIMO channel. Thus, the method of the present disclosure transforms a Gaussian MIMO channel with low resolution ADC, e.g., a one-bit or a p-level modulo ADC, into a linear MIMO channel over a finite field, thereby reducing implementation complexity.

The following examples pertain to further embodiments.

Example 1 is an apparatus for detecting data transmitted over a wireless channel, the apparatus comprising: an Analog-to-Digital Converter (ADC) configured, for each receive antenna of a plurality of receive antennas of a receiver device, to convert an analog signal received by the receive antenna to a respective digital signal; a channel transformer configured, for each receive antenna of the plurality of receive antennas, to channel transform the digital signal to determine a respective equivalent integer representation of the digital signal; and a receive combiner configured to detect data by receive combining the respective equivalent integer representations of the digital signals determined for the plurality of receive antennas.

In Example 2, the subject matter of Example 1, wherein the channel transforming is based on a known effective channel matrix.

In Example 3, the subject matter of Example 1, wherein the ADC comprises a one-bit ADC.

In Example 4, the subject matter of Example 1, wherein the ADC comprises a p-level scalar quantizer.

In Example 5, the subject matter of Example 4, wherein the p-level scalar quantizer comprises a sawtooth transform.

In Example 6, the subject matter of Example 5, wherein, when the p-level scalar quantizer is a sawtooth transform implemented by a scalar quantizer followed by a modulo operator.

In Example 7, the subject matter of Example 1, wherein the detected data is provided to a demodulator of the receiver device.

In Example 8, the subject matter of Example 1, wherein the receive combining comprises selecting a receive antenna from among the plurality of receive antennas.

In Example 9, the subject matter of Example 8, wherein the selected receive antenna provides a sub-channel with a highest channel capacity.

In Example 10, the subject matter of Example 8, wherein the selected receive antenna is identified by determining the sub-channel with a minimum entropy of an effective noise.

In Example 11, the subject matter of Example 1, wherein the receive combining comprises applying a majority decoding principle when repetition coding over a spatial domain is used.

In Example 12, the subject matter of Example 11, wherein the repetition coding over the spatial domain is for transmitting same data to the plurality of receive antennas through different respective plurality of sub-channels.

In Example 13, the subject matter of Example 1, wherein the receive combining comprises detecting the data by identifying a linear block code with a minimum distance from the equivalent integer representations of the digital signals.

In Example 14, the subject matter of Example 13, wherein the identifying of the linear block code with the minimum distance is based on a known effective binary channel matrix and a known set of all possible linear block codes that are transmitted to the plurality of receive antennas.

In Example 15, the subject matter of Example 1, wherein the receive combining comprises detecting the data by performing inter-stream interference cancelation.

In Example 16, the subject matter of Example 15, wherein the inter-stream interference cancelation is performed using an inverse of an effective binary channel matrix known by the receiver device.

In Example 17, the subject matter of Example 16, wherein the detecting of the data by using the inverse of the effective binary channel matrix is performed when a number of transmit antennas of a transmitter device is equal to a number of receive antennas of the receiver device.

In Example 18, the subject matter of Example 16, wherein, when the number of receive antennas of the receiver device is greater than the number of transmit antennas of the transmitter device, the detecting of the data by using the inverse of the effective binary channel matrix is performed by selecting a number of receive antennas equal to the number of transmit antennas of the transmitter device.

In Example 19, the subject matter of Example 1, wherein the inter-stream interference cancelation is performed when the data is encoded using a family of nested linear codes.

Example 20 is a wireless device comprising: an array of receive antennas configured to receive a plurality of signals; and the apparatus for detecting data transmitted over a wireless channel of the subject matter of Example 1.

In Example 21, the subject matter of Example 20, wherein the wireless device is a user equipment or a base station.

Example 22 is a method for detecting data transmitted over a wireless channel, the method comprising: for each receive antenna of a plurality of receive antennas, converting, by an ADC, an analog signal received by the receive antenna to a respective digital signal; for each receive antenna of a plurality of receive antennas, channel transforming, by a channel transformer, the digital signal to determine a respective equivalent integer representation of the digital signal; and detecting data by receive combining, by a receive combiner, the respective equivalent integer representations of the digital signals determined for the plurality of receive antennas.

In Example 23, the subject matter of Example 22, wherein the detecting data by receive combining comprises one of: selecting a receive antenna from among the plurality of receive antennas; applying a majority decoding principle when repetition coding over a spatial domain is used; detecting the data by identifying a linear block code with a minimum distance from the equivalent integer representations of the digital signals; and detecting the data by performing inter-stream interference cancelation.

Example 24 is a device comprising: a processor; and a memory configured to store a program instructions to be executed by the processor, where executing the program instructions causes the processor to perform operations for detecting data transmitted over a wireless channel, the operations comprising: for each receive antenna of a plurality of receive antennas, converting, by an ADC, an analog signal received by the receive antenna to a respective digital signal; for each receive antenna of a plurality of receive antennas, channel transforming, by a channel transformer, the digital signal to determine a respective equivalent integer representation of the digital signal; and detecting data by receive combining, by a receive combiner, the respective equivalent integer representations of the digital signals determined for the plurality of receive antennas.

In Example 25, the subject matter of Example 24, wherein the detecting data by receive combining comprises one of: selecting a receive antenna from among the plurality of receive antennas; applying a majority decoding principle when repetition coding over a spatial domain is used; detecting the data by identifying a linear block code with a minimum distance from the equivalent integer representations of the digital signals; and detecting the data by performing inter-stream interference cancelation.

Example 26 is an apparatus for detecting data transmitted over a wireless channel, the apparatus comprising: an Analog-to-Digital Converting means (ADC), for each receive antenna of a plurality of receive antennas of a receiver device, converting an analog signal received by the receive antenna to a respective digital signal; a channel transforming means, for each receive antenna of the plurality of receive antennas, channel transforming the digital signal to determine a respective equivalent integer representation of the digital signal; and a receive combining means for detecting data by receive combining the respective equivalent integer representations of the digital signals determined for the plurality of receive antennas.

In Example 27, the subject matter of Example 26, wherein the channel transforming is based on a known effective channel matrix.

In Example 28, the subject matter of Example 26, wherein the ADC comprises a one-bit ADC.

In Example 29, the subject matter of Example 26, wherein the ADC comprises a p-level scalar quantizer.

In Example 30, the subject matter of Example 29, wherein the p-level scalar quantizer comprises a sawtooth transform.

In Example 31, the subject matter of Example 30, wherein, when the p-level scalar quantizer is a sawtooth transform implemented by a scalar quantizer followed by a modulo operator.

In Example 32, the subject matter of Example 26, wherein the detected data is provided to a demodulating means of the receiver device.

In Example 33, the subject matter of Example 26, wherein the receive combining comprises selecting a receive antenna from among the plurality of receive antennas.

In Example 34, the subject matter of Example 33, wherein the selected receive antenna provides a sub-channel with a highest channel capacity.

In Example 35, the subject matter of Example 33, wherein the selected receive antenna is identified by determining the sub-channel with a minimum entropy of an effective noise.

In Example 36, the subject matter of Example 26, wherein the receive combining comprises applying a majority decoding principle when repetition coding over a spatial domain is used.

In Example 37, the subject matter of Example 36, wherein the repetition coding over the spatial domain is for transmitting same data to the plurality of receive antennas through different respective plurality of sub-channels.

In Example 38, the subject matter of Example 26, wherein the receive combining comprises detecting the data by identifying a linear block code with a minimum distance from the equivalent integer representations of the digital signals.

In Example 39, the subject matter of Example 38, wherein the identifying of the linear block code with the minimum distance is based on a known effective binary channel matrix and a known set of all possible linear block codes that are transmitted to the plurality of receive antennas.

In Example 40, the subject matter of Example 26, wherein the receive combining comprises detecting the data by performing inter-stream interference cancelation.

In Example 41, the subject matter of Example 40, wherein the inter-stream interference cancelation is performed using an inverse of an effective binary channel matrix known by the receiver device.

In Example 42, the subject matter of Example 41, wherein the detecting of the data by using the inverse of the effective binary channel matrix is performed when a number of transmit antennas of a transmitter device is equal to a number of receive antennas of the receiver device.

In Example 42, the subject matter of Example 41, wherein, when the number of receive antennas of the receiver device is greater than the number of transmit antennas of the transmitter device, the detecting of the data by using the inverse of the effective binary channel matrix is performed by selecting a number of receive antennas equal to the number of transmit antennas of the transmitter device.

In Example 44, the subject matter of Example 26, wherein the inter-stream interference cancelation is performed when the data is encoded using a family of nested linear codes.

Example 45 is a wireless device comprising: an array of receive antennas configured to receive a plurality of signals; and the apparatus for detecting data transmitted over a wireless channel of the subject matter of Example 26.

In Example 46, the subject matter of Example 45, wherein the wireless device is a user equipment or a base station.

What is claimed is:

1. An apparatus for detecting data transmitted over a wireless channel, the apparatus comprising:
    an Analog-to-Digital Converter (ADC) configured, for each receive antenna of a plurality of receive antennas of a receiver device, to convert an analog signal received by the receive antenna to a respective digital signal, the ADC comprising a one-bit ADC or a p-level scalar quantizer;
    a channel transformer configured, for each receive antenna of the plurality of receive antennas, to channel transform the digital signal to determine a respective equivalent integer representation of the digital signal; and
    a receive combiner configured to detect data by receive combining the respective equivalent integer representations of the digital signals determined for the plurality of receive antennas.

2. The apparatus of claim 1, wherein the channel transforming is based on a known effective channel matrix.

3. The apparatus of claim 1, wherein the p-level scalar quantizer comprises a sawtooth transform.

4. The apparatus of claim 3, wherein, when the p-level scalar quantizer is a sawtooth transform implemented by a scalar quantizer followed by a modulo operator.

5. The apparatus of claim 1, wherein the detected data is provided to a demodulator of the receiver device.

6. The apparatus of claim 1, wherein the receive combining comprises selecting a receive antenna from among the plurality of receive antennas.

7. The apparatus of claim 6, wherein the selected receive antenna provides a sub-channel with a highest channel capacity.

8. The apparatus of claim 6, wherein the selected receive antenna is identified by determining the sub-channel with a minimum entropy of an effective noise.

9. An apparatus for detecting data transmitted over a wireless channel, the apparatus comprising:
  an Analog-to-Digital Converter (ADC) configured, for each receive antenna of a plurality of receive antennas of a receiver device, to convert an analog signal received by the receive antenna to a respective digital signal;
  a channel transformer configured, for each receive antenna of the plurality of receive antennas, to channel transform the digital signal to determine a respective equivalent integer representation of the digital signal; and
  a receive combiner configured to detect data by receive combining the respective equivalent integer representations of the digital signals determined for the plurality of receive antennas, wherein the receive combining comprises:
    applying a majority decoding principle when repetition coding over a spatial domain is used, or
    detecting the data by identifying a linear block code with a minimum distance from the equivalent integer representations of the digital signals, or
    detecting the data by performing inter-stream interference cancelation.

10. The apparatus of claim 9, wherein the repetition coding over the spatial domain is for transmitting same data to the plurality of receive antennas through different respective plurality of sub-channels.

11. The apparatus of claim 9, wherein the identifying of the linear block code with the minimum distance is based on a known effective binary channel matrix and a known set of all possible linear block codes that are transmitted to the plurality of receive antennas.

12. The apparatus of claim 9, wherein the inter-stream interference cancelation is performed using an inverse of an effective binary channel matrix known by the receiver device.

13. The apparatus of claim 12, wherein the detecting of the data by using the inverse of the effective binary channel matrix is performed when a number of transmit antennas of a transmitter device is equal to a number of receive antennas of the receiver device.

14. The apparatus of claim 12, wherein, when the number of receive antennas of the receiver device is greater than the number of transmit antennas of the transmitter device, the detecting of the data by using the inverse of the effective binary channel matrix is performed by selecting a number of receive antennas equal to the number of transmit antennas of the transmitter device.

15. The apparatus of claim 9, wherein the inter-stream interference cancelation is performed when the data is encoded using a family of nested linear codes.

16. A wireless device comprising:
  an array of receive antennas configured to receive a plurality of signals; and
  an apparatus for detecting data transmitted over a wireless channel, the apparatus comprising:
    an Analog-to-Digital Converter (ADC) configured, for each receive antenna of a plurality of receive antennas of a receiver device, to convert an analog signal received by the receive antenna to a respective digital signal, the ADC comprising a one-bit ADC or a p-level scalar quantizer;
    a channel transformer configured, for each receive antenna of the plurality of receive antennas, to channel transform the digital signal to determine a respective equivalent integer representation of the digital signal; and
    a receive combiner configured to detect data by receive combining the respective equivalent integer representations of the digital signals determined for the plurality of receive antennas.

17. The wireless device of claim 16, wherein the wireless device is a user equipment or a base station.

18. A method for detecting data transmitted over a wireless channel, the method comprising:
  for each receive antenna of a plurality of receive antennas, converting, by an ADC, an analog signal received by the receive antenna to a respective digital signal;
  for each receive antenna of a plurality of receive antennas, channel transforming, by a channel transformer, the digital signal to determine a respective equivalent integer representation of the digital signal; and
  detecting data by receive combining, by a receive combiner, the respective equivalent integer representations of the digital signals determined for the plurality of receive antennas, wherein the detecting data by receive combining comprises one of:
    selecting a receive antenna from among the plurality of receive antennas;
    applying a majority decoding principle when repetition coding over a spatial domain is used;
    detecting the data by identifying a linear block code with a minimum distance from the equivalent integer representations of the digital signals; and
    detecting the data by performing inter-stream interference cancelation.

19. A device comprising:
  a processor; and
  a memory configured to store a program instructions to be executed by the processor, where executing the program instructions causes the processor to perform operations for detecting data transmitted over a wireless channel, the operations comprising:
    for each receive antenna of a plurality of receive antennas, converting, by an ADC, an analog signal received by the receive antenna to a respective digital signal;
    for each receive antenna of a plurality of receive antennas, channel transforming, by a channel transformer, the digital signal to determine a respective equivalent integer representation of the digital signal; and
    detecting data by receive combining, by a receive combiner, the respective equivalent integer representations of the digital signals determined for the plurality of receive antennas, wherein the detecting data by receive combining comprises one of:
      selecting a receive antenna from among the plurality of receive antennas;
      applying a majority decoding principle when repetition coding over a spatial domain is used;

detecting the data by identifying a linear block code with a minimum distance from the equivalent integer representations of the digital signals; and detecting the data by performing inter-stream interference cancelation.

\* \* \* \* \*